United States Patent
Zettl

(10) Patent No.: US 10,596,542 B2
(45) Date of Patent: Mar. 24, 2020

(54) METHOD AND DEVICE TO SYNTHESIZE BORON NITRIDE NANOTUBES AND RELATED NANOPARTICLES

(71) Applicant: The Regents of the University of California, Oakland, CA (US)

(72) Inventor: Alexander K. Zettl, Kensington, CA (US)

(73) Assignee: The Regents of the University of California, Oakland, CA (US)

(*) Notice: Subject to any disclaimer, the term of this patent is extended or adjusted under 35 U.S.C. 154(b) by 193 days.

(21) Appl. No.: 15/206,143

(22) Filed: Jul. 8, 2016

(65) Prior Publication Data

US 2016/0317997 A1 Nov. 3, 2016

Related U.S. Application Data

(62) Division of application No. 13/635,897, filed as application No. PCT/US2011/029223 on Mar. 21, 2011, now Pat. No. 9,394,632.

(Continued)

(51) Int. Cl.
*B01J 19/08* (2006.01)
*C04B 35/622* (2006.01)
(Continued)

(52) U.S. Cl.
CPC ......... *B01J 19/088* (2013.01); *C01B 21/0641* (2013.01); *C04B 35/6229* (2013.01);
(Continued)

(58) Field of Classification Search
CPC .............. B01J 19/088; B01J 2219/0809; B01J 2219/0824; B01J 2219/0898; B01J 19/126;
(Continued)

(56) References Cited

U.S. PATENT DOCUMENTS 3,659,132 A  4/1972  Eckhardt et al.
4,661,682 A  4/1987  Gruner et al.
(Continued)

FOREIGN PATENT DOCUMENTS

WO   WO 2014/169832 A1   10/2014

OTHER PUBLICATIONS

Y.Chen et al., A solid-state process for formation of boron nitride nanotubes, Appl. Phys. Lett. 1999, 74 (20) 2960-2962.
(Continued)

*Primary Examiner* — Xiuyu Tai
(74) *Attorney, Agent, or Firm* — Knobbe, Martens, Olson & Bear, LLP

(57) ABSTRACT

Methods and apparatus for producing chemical nanostructures having multiple elements, such as boron and nitride, e.g. boron nitride nanotubes, are disclosed. The method comprises creating a plasma jet, or plume, such as by an arc discharge. The plasma plume is elongated and has a temperature gradient along its length. It extends along its length into a port connector area having ports for introduction of feed materials. The feed materials include the multiple elements, which are introduced separately as fluids or powders at multiple ports along the length of the plasma plume, said ports entering the plasma plume at different temperatures. The method further comprises modifying a temperature at a distal portion of or immediately downstream of said plasma plume; and collecting said chemical nanostructures after said modifying.

18 Claims, 2 Drawing Sheets

Related U.S. Application Data

(60) Provisional application No. 61/316,101, filed on Mar. 22, 2010.

(51) Int. Cl.
*D01F 9/08* (2006.01)
*C01B 21/064* (2006.01)
*B82Y 40/00* (2011.01)

(52) U.S. Cl.
CPC ......... *D01F 9/08* (2013.01); *B01J 2219/0809* (2013.01); *B01J 2219/0824* (2013.01); *B01J 2219/0898* (2013.01); *B82Y 40/00* (2013.01); *Y10S 977/831* (2013.01); *Y10S 977/896* (2013.01)

(58) Field of Classification Search
CPC ................ B01J 23/74; B01J 2219/0847; B01J 2219/0871; B01J 2219/0879; B01J 2219/0894; C01B 21/0641; C01B 32/162; C04B 35/6229; B82Y 40/00; B82Y 30/00; Y10S 977/831; Y10S 977/896; D01F 9/08; B22F 1/0018; B22F 9/12; B22F 1/0088; B22F 9/082; B22F 2202/13; B22F 9/14; B22F 2009/0824; B22F 2009/084; B22F 2998/10; B22F 2999/00; B22F 2005/002; H05H 1/46
See application file for complete search history.

(56) References Cited

U.S. PATENT DOCUMENTS

| | | | |
|---|---|---|---|
| 4,791,077 A | 12/1988 | Kim et al. | |
| 5,368,897 A | 11/1994 | Kurihara et al. | |
| 6,063,243 A | 5/2000 | Zettl et al. | |
| 6,231,980 B1 | 5/2001 | Cohen et al. | |
| 6,379,419 B1 | 4/2002 | Celik et al. | |
| 6,444,009 B1* | 9/2002 | Liu | B22F 1/0018 75/332 |
| 6,652,822 B2 | 11/2003 | Phillips et al. | |
| 6,915,964 B2 | 7/2005 | Tapphorn et al. | |
| 2003/0211030 A1 | 11/2003 | Olivier et al. | |
| 2005/0118090 A1 | 6/2005 | Shaffer et al. | |
| 2007/0044513 A1 | 3/2007 | Kear et al. | |
| 2007/0266825 A1* | 11/2007 | Ripley | B01J 19/126 75/330 |
| 2009/0117021 A1 | 5/2009 | Smith et al. | |
| 2010/0051879 A1 | 3/2010 | Sainsbury et al. | |
| 2013/0064750 A1 | 3/2013 | Zettl | |
| 2015/0125374 A1 | 5/2015 | Smith et al. | |

OTHER PUBLICATIONS

M. L. Cohen and A. Zettl, The physics of boron nitride nanotubes, Phys. Today 2010, 63 (11) 34-38.

J. Cuming and A. Zettl, Mass-production of boron nitride double-wall nanotubes and nanococoons, Chem. Phys. Lett. 2000, 316 (3-4) 211-216.

A. Fathalizadeh et al., Scaled Synthesis of Boron Nitride Nanotubes, Nanoribbons, and Nanococoons Using Direct Feedstock Injection into an Extended-Pressure, Inductively-Coupled Thermal Plasma, Nano Lett. 2014, 14, 4881-4886.

D. Golberg et al., Nanotubes in boron nitride laser heated at high pressure, Appl. Phys. Lett. 1996, 69 (14) 2045-2047.

W. Han et al., Synthesis of boron nitride nanotubes from carbon nanotubes by a substitution reaction, Appl. Phys. Lett. 1998, 73 (21) 3085-3087.

K. S. Kim et al, Large-scale production of single-walled carbon nanotubes by induction thermal plasma, J. Phys. D: Appl. Phys. 2007, 40 (8) 2375-2387.

K. S. Kim et al., Hydrogen-Catalyzed, Pilot-Scale Production of Small-Diameter Boron Nitride Nanotubes and Their Macroscopic Assemblies, ACS Nano 2014, 8, 6211-6220.

A. Loiseau et al., Boron Nitride Nanotubes with Reduced Numbers of Layers Synthesized by Arc Discharge, Phys. Rev. Lett. 1996, 76 (25) 4737-4740.

O. R. Lourie et al., CVD Growth of Boron Nitride Nanotubes, Chem. Mater. 2000, 12 (7) 1808-1810.

Y. Shimizu et al., Boron nitride nanotubes, webs, and coexisting amorphous phase formed by the plasma jet method, Appl. Phys. Lett. 1999, 75 (7) 929-931.

M. W. Smith et al., Very long single- and few-walled boron nitride nanotubes via the pressurized vapor/condenser method, Nanotechnology 2009, 20 (50) 505604.

M. Terrones, Science and Technology of the Twenty-First Century: Synthesis, Properties, and Applications of Carbon Nanotubes, Annu. Rev. Mater. Res. 2003, 33, 419-501.

C. Zhi et al., Effective precursor for high yield synthesis of pure BN nanotubes, Solid State Commun. 2005, 135 (1-2) 67-70.

Chopra, et al., Boron Nitride Nanotubes, Science, vol. 269, Aug. 18, 1995, pp. 966-967.

International Preliminary Report on Patentability and Written Opinion, PCT/US2011/029223, dated Oct. 4, 2012.

Chen, et al. Boron nitride nanotubes are Noncytotoxic and can be functionalized for interaction with proteins and cells, J.Am. Chem. Soc., 2009, 131, 890-891.

Ni, et al., Synthesis, structural and mechanical characterization of amorphous and crystalline boron nanobelts, Journal of Nano Research, vol. 1 (2008) pp. 10-22.

W.Q. Han, W. Mickelson, J. Cumings, and A. Zettl, Transformation of BxCyNz nanotubes to pure BN nanotubes, Appl. Phys. Lett., 81 (2002), pp. 1110-1112.

* cited by examiner

METHOD AND DEVICE TO SYNTHESIZE BORON NITRIDE NANOTUBES AND RELATED NANOPARTICLES

CROSS-REFERENCE TO RELATED APPLICATIONS

This application is a divisional application of U.S. patent application Ser. No. 13/635,897, filed on Nov. 26, 2012, which is the U.S. National Phase of International Application No. PCT/US2011/029223, filed on Mar. 21, 2011, which claims priority to U.S. Provisional Application No. 61/316,101, filed on Mar. 22, 2010, the disclosures of which are incorporated herein by reference in their entireties.

STATEMENT OF GOVERNMENTAL SUPPORT

This invention was made with U.S. Government support under Contract Number DEAC02-05CH11231 between the U.S. Department of Energy and The Regents of the University of California for the management and operation of the Lawrence Berkeley National Laboratory. The U.S. Government has certain rights in this invention.

BACKGROUND OF THE INVENTION

Field of the Invention

The present invention relates to chemical nanostructures having multiple elements, such as nanotubes and nanoparticles, more specifically to nanotubes and nanoparticles containing the elements of boron, carbon and nitrogen, and more specifically to synthesis of such materials using a plasma jet or plume.

Related Art

Presented below is background information on certain aspects of the present invention as they may relate to technical features referred to in the detailed description, but not necessarily described in detail. That is, individual parts or methods used in the present invention may be described in greater detail in the materials discussed below, which materials may provide further guidance to those skilled in the art for making or using certain aspects of the present invention as claimed. The discussion below should not be construed as an admission as to the relevance of the information to any claims herein or the prior art effect of the material described.

Boron-nitride-containing nanotubes (BNNTs) and related materials have many unusual and potentially useful properties, including exceptional thermal conductivity, uniform electronic bandgap, high mechanical strength, white color, and functionalization capability. Different synthesis methods have been used to produce limited amounts of BNNTs, including arc growth, modified chemical vapor deposition, and laser vaporization. Unfortunately, all of these methods are not easily scaled up to meaningful industrial production levels. The synthesis bottleneck is the major reason BNNTs and related materials have not enjoyed widespread application.

Pure boron nitride nanotubes consist of alternating B—N bonds, arranged in a hexagonal pattern similar to that of carbon nanotubes. A boron nitride nanotube may be visualized essentially as a rolled on itself graphite-like sheet, where carbon atoms are alternately substituted by nitrogen and boron atoms. Structurally, it is a close analog of the carbon nanotube, namely a long cylinder with diameter on the order of one to about one hundred nanometers and length up to many microns or even centimeters. The properties of BNNTs nanotubes are very different from those of pure carbon nanotubes: whereas carbon nanotubes can be metallic or semiconducting depending on the rolling direction and radius, a BN nanotube may act as a semiconductor or an electrical insulator with a bandgap of ~5.5 eV, basically independent of tube chirality and morphology. BNNTs have high resistance to oxidation and are structurally stable and inert to most chemicals. It would be useful to find a way to exploit the intrinsic properties of BNNTs for various materials and device applications. In order to do this, surface modification of the BNNT, including functionalization with small molecules, polymers, nanoparticles, and thin films, would be useful. In addition, a layered BN structure is much more thermally and chemically stable than a graphitic carbon structure.

Boron nitride nanotubes were theoretically predicted in 1994 (Cohen and coworkers) and first experimentally synthesized in 1995 (Zettl and coworkers, Science, 18 Aug. 1995: Vol. 269. no. 5226, pp. 966-967). Alloy and doped BNNTs have also been produced. Boron nitride thin sheets, analogous to graphene, have also been produced, and may be produced by the methods and apparatus described here.

Specific Patents and Publications

U.S. Pat. No. 6,063,243 to Zettl et al., issued May 16, 200, entitled "Method for making nanotubes and nanoparticles," describes novel electrodes for use in arc discharge techniques. The electrodes have interior conduits for delivery and withdrawal of material from the arc region where product is formed. In one embodiment, the anode is optionally made from more than one material and is termed a compound anode. The materials used in the compound anode assist in the reaction that forms product in the arc region of the apparatus. The materials assist either by providing reaction ingredients, catalyst, or affecting the reaction kinetics. The device comprises an arc-discharge chamber provides a controllable ambient gas environment. In this apparatus, either the compound anode or the material injected through either of the electrodes and may be the source of material for product formation in the arc region. For example, to produce a product comprising nanotube and nanoparticles of sp$^2$-bonded $B_xC_yN_z$, an electrode may inject into the arc region, a type of gas comprising elements from the group consisting of boron, nitrogen and carbon. In that case, the anode may or may not include the element injected through the conduits of the cathode and the anode. The nanoparticles and nanotubes formed within the product deposited on the cathode comprise individual particles and tubes having inner diameters on the order of nanometers.

US US20090117021 by Smith et al., published May 7, 2009 entitled "Boron Nitride Nanotubes," discloses a method in which boron nitride nanotubes are prepared by a process which includes: (a) creating a source of boron vapor; (b) mixing the boron vapor with nitrogen gas so that a mixture of boron vapor and nitrogen gas is present at a nucleation site, which is a surface, the nitrogen gas being provided at a pressure elevated above atmospheric, e.g., from greater than about 2 atmospheres up to about 250 atmospheres; and (c) harvesting boron nitride nanotubes, which are formed at the nucleation site. It also disclosed there that, since the announcement of the successful synthesis of high-aspect-ratio few-walled boron nitride nanotubes (FW-BNNTs) in 1995, little progress has been made in the scale-up of their synthesis.

US 2010/0051879 by Sainsbury et al., published Mar. 4, 2010, entitled "Functionalized Boron Nitride Nanotubes," discloses that BNNTs can be synthesized on Si substrates by thermal decomposition of B and MgO powders in an ammonia environment at 1200° C. in an electric furnace.

U.S. Pat. No. 6,231,980 issued May 15, 2001, by Cohen et al., entitled "BxCyNz nanotubes and nanoparticles," discloses crystalline nanoscale particles and tubes made from a variety of stoichiometries of $B_xC_yN_z$ where x, y, and z indicate a relative amount of each element compared to the others and where no more than one of x, y, or z are zero for a single stoichiometry. Anode rods of different structure and B—C—N composition were prepared and subsequently arced against pure graphite cathodes. A number of anode-type, arc current, and helium pressure combinations were investigated. $BC_2N$ nanotubes and $BC_3$ nanotubes were produced using a high purity graphite rod (about 0.250-in. diameter) that was center drilled to slip-fit a high-purity, hot-pressed BN rod (about 0.125-in. diameter) inside.

BRIEF SUMMARY OF THE INVENTION

The following brief summary is not intended to include all features and aspects of the present invention, nor does it imply that the invention must include all features and aspects discussed in this summary.

The present invention relates to improved methods and devices for the production of BxCyNz nanotubes and related particles, such as described in the above-referenced U.S. Pat. No. 6,231,980. The device is generally applicable to any nanomaterial where different elements are to be combined under controlled conditions of stoichiometry, temperature, concentration and pressure.

In certain aspects, the present invention comprises a method for producing chemical nanostructures having multiple elements, comprising the steps of creating a plasma plume or jet having a temperature gradient along its length and extending along its length into a port connector area; introducing said multiple elements separately as fluids or powders at multiple ports along the length of the plasma jet, said ports entering the plasma jet at different temperatures; modifying a temperature at a distal portion of or immediately downstream of said plasma jet; and collecting said nanostructures after said modifying of temperature.

The method may comprise methods where said chemical nanostructures are BN-based nanomaterials, including BN nanotubes, BN spheres and BN sheets. The introducing of multiple elements may take place as the introduction of elemental boron and nitrogen and optionally carbon. The feedstock may also comprise compounds to be broken down so that individual elements are contributed. For example, the carbon may be introduced in the form of a hydrocarbon or an alcohol. The hydrocarbon may be a lower alkane or alkene and is preferably a liquid or gas.

In certain aspects, the present invention comprises a method wherein said plasma is created by an arc discharge between two electrodes arranged to form a nozzle. The plasma plume or jet may be extended in length by a propellant gas. In certain aspects, the present invention comprises a method wherein modifying a temperature of gas comprises a water-cooled member contacting a distal portion of the plasma plume. The water-cooled member may be a water-carrying tube which is of a shape that is linear, annular or serpentine.

In certain aspects, the present invention comprises a method wherein said collecting comprises collecting said nanoscale particles on a mesh.

In certain aspects, the present invention comprises an apparatus for forming chemical nanostructures having multiple elements, comprising: a source of plasma; a port connector area connected to said plasma source for receiving said plasma and introducing chemical elements; a chamber connected to said port connector area and comprising a quench moderator for modifying a temperature of gas comprised in said plasma; and a collection surface for collecting said chemical nanostructures. The quench moderator may be a cooled, inert member adjacent to the plasma and shaped as a linear rod, serpentine rod or torus. The quench moderator may be within the plasma plume and arranged to permit passage of the plasma plume past the quench moderator.

In certain aspects, the present invention comprises an apparatus for forming nanoscale particles and tubes having multiple elements, comprising: a source of electric potential difference across terminals of an arc for creating a plasma; a nozzle region for forming plasma having a plasma plume; a port connector area connected to said nozzle region for receiving said plasma plume; ports disposed along the length of the plasma plume for introducing multiple elements as fluids or powders at multiple ports along the length of the plasma plume, said ports entering the plasma plume at different temperatures; a quench moderator for modifying a temperature of gas at a distal portion of or immediately downstream of said plasma plume; and a collection surface for collecting said nanoscale particles. The apparatus may further comprise a design wherein said nozzle region comprises an anode and cathode for further comprising a collection area for particles after said modifying.

DETAILED DESCRIPTION OF THE PREFERRED EMBODIMENT

Overview

Definitions

Figure 1:
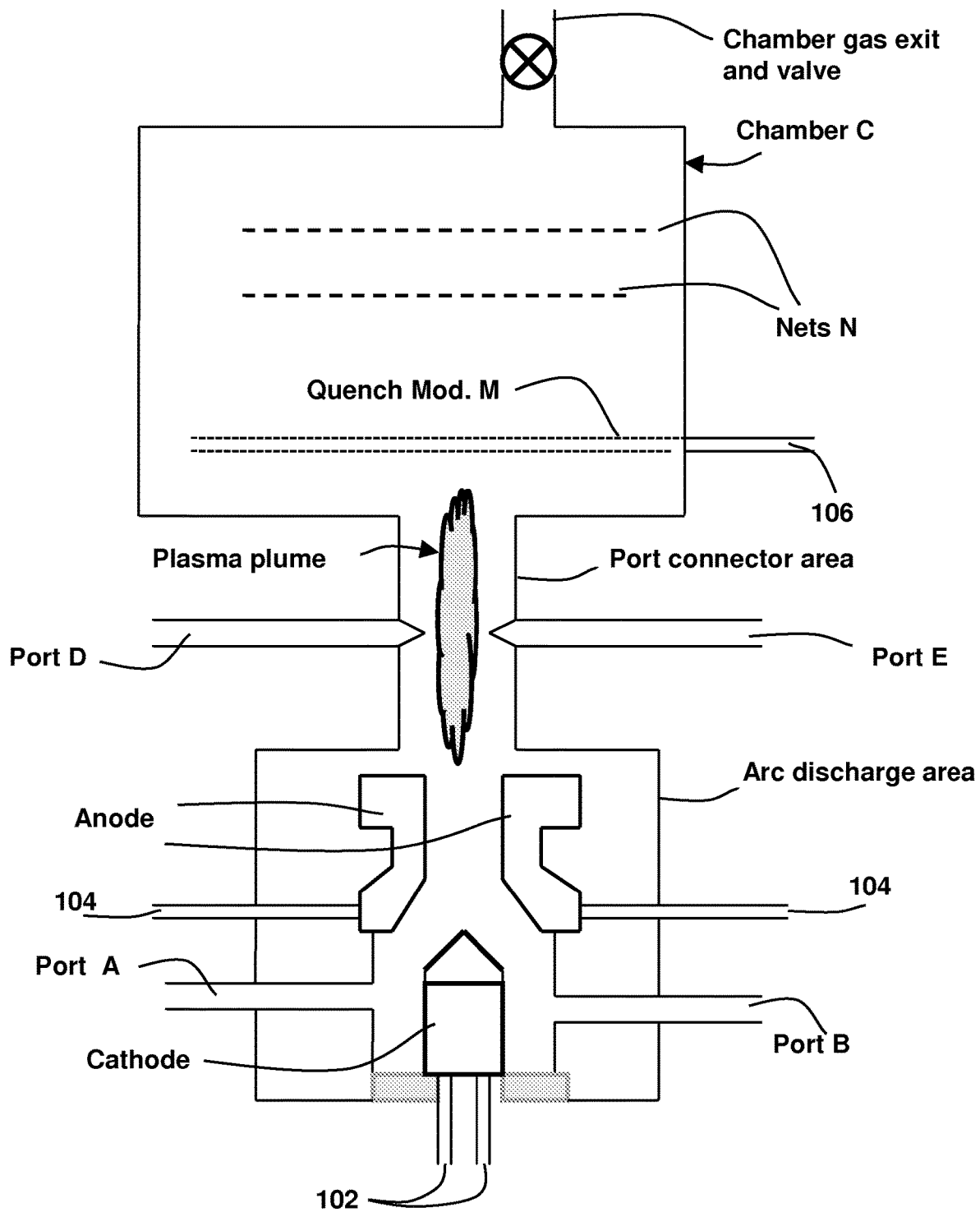
FIG. 1 is a schematic diagram of a side view of a device according to the present invention.

Unless defined otherwise, all technical and scientific terms used herein have the same meaning as commonly understood by those of ordinary skill in the art to which this invention belongs. Although any methods and materials similar or equivalent to those described herein can be used in the practice or testing of the present invention, the preferred methods and materials are described. Generally, nomenclatures utilized in connection with, and techniques of, material science and physics are those well known and commonly used in the art. Certain experimental techniques, not specifically defined, are generally performed according to conventional methods well known in the art and as described in various general and more specific references that are cited and discussed throughout the present specification. For purposes of clarity, the following terms are defined below.

The term "nanoparticles" is used herein to refer generally to chemical nanostructures, especially chemical nanostructures having multiple elements, such as boron, nitrogen and carbon, where the elements are covalently bonded in regular patterns in substantial part. These nanoparticles include nanoscale rods, wires, tubes, sheets, spheres, etc, having defined chemical patterns at the atomic level conferring certain properties due to the size of the materials, typically on the order of one atom thick per layer, with a graphite-type structure, such as carbon nanotubes, which may be single- or multi-walled, and, especially BN-based (i.e. the majority, preferably at least about 90%, of elements in the material are either boron or nitrogen) nanomaterial. The term nanoscale will refer to dimensions that range from 0.1 nanometers to 100 nanometers (0.10 micrometer) in the smallest dimension.

The term "BN-based nanomaterial" means materials based in part on the atomic in-plane bonding found in hexagonal boron nitride (h-BN), a layered material with a graphite-type structure in which planar networks of BN hexagons are regularly stacked. The present BN-based nanomaterials may include a nanowire having a diameter of, for example, less than 100 nm or a nanotube, for example a single-wall nanotube, with a diameter of, for example, less than 10 nm. The nanostructure can also be a nanofiber with a diameter of, for example, less than 1 nm. The boron atoms of the nanofibers can be arranged in a polyethylene-like chain structure, with the nanofibers aligned in a parallel fashion or intertwined. It may have the chemical formula BN, consisting of equal numbers of boron and nitrogen atoms, or it may contain carbon according to the formula described above, $B_xC_yN_z$. In this formula, x, y, and z indicate a relative amount of each element compared to the others and where no more than one of x, y, or z are zero for a single stoichiometry. The actual numerical values of x, y and z will depend on the geometry and morphology of the nanoparticle (including, for example, multiple shells each with a different stoichiometry). Nanotubes may have, for example, diameters between about 1 nm and about 0.1 μm and lengths between about 0.1 and about 100 micrometers. The term specifically includes BN single-wall or multi-wall nanotubes that have a structure similar to that of carbon nanotubes, i.e., graphene (or BN) sheets rolled on themselves. $B_xC_yN_z$ Nanotubes can be converted to pure BN nanotubes, as described in *Applied Physics Letters, August* 2002, 81(6): 1110-1112.

The term "plasma" is used in its conventional sense to mean a gas in which a certain portion of the particles are ionized Like gas, plasma does not have a definite shape or a definite volume unless enclosed in a container; unlike gas, in the influence of a magnetic field, it may form structures such as filaments, beams, etc. The presently preferred plasma is formed by an electric arc formed by an electrical breakdown of a gas. The term "plasma jet" indicates a plasma made to move in specified direction with a finite velocity.

General Method and Apparatus

The present invention utilizes a plasma arc that is formed into a plasma plume by movement of the ionized gas in the plasma predominantly in a single direction, i.e., a plasma jet. Preferably, the plasma is produced in an electric arc created by a voltage potential between two electrodes, namely a cathode and an anode. The material to be ionized in the plasma is provided by a gaseous stream introduced between the cathode and the anode, flowing between them and into an environmental chamber. The environmental chamber, which is constructed to contain pressure and temperature controls and to be pressurized or evacuated, heated or cooled, further comprises an element in the vicinity of, or directly in the plasma plume, and contains a coolant for cooling the plasma entering the chamber. The chamber also comprises collection elements in addition to, or as part of the quench moderator. Thus, a plasma plume is a moving plasma cloud created by the ionization of elements introduced at a controlled rate in one or more gaseous feed streams, which may or may not contain particulates. The streams are introduced at selected portions of the plasma plume and are controlled as to velocity and concentration of feedstock. The streams may contain an inert carrier gas, such as argon, as well as individual elements that will be combined to form the nanoparticles to be collected in the environmental chamber. These may be, for boron nitride nanomaterials, feedstock materials such as boron particles, nitrogen gas, hydrocarbons, catalyst particles, etc. The plasma plume carries the feed materials into an environmental chamber, where the plasma plume is cooled by a quench moderating structure, and the feed materials are allowed to condense in a controlled manner into boron-containing nanomaterials deposited on quench moderator and also, preferably, on collection nets or grids downstream of the quench moderator, which grids have a larger collecting surface to increase the yield of nanomaterials.

Specific Embodiments

Figure 2:
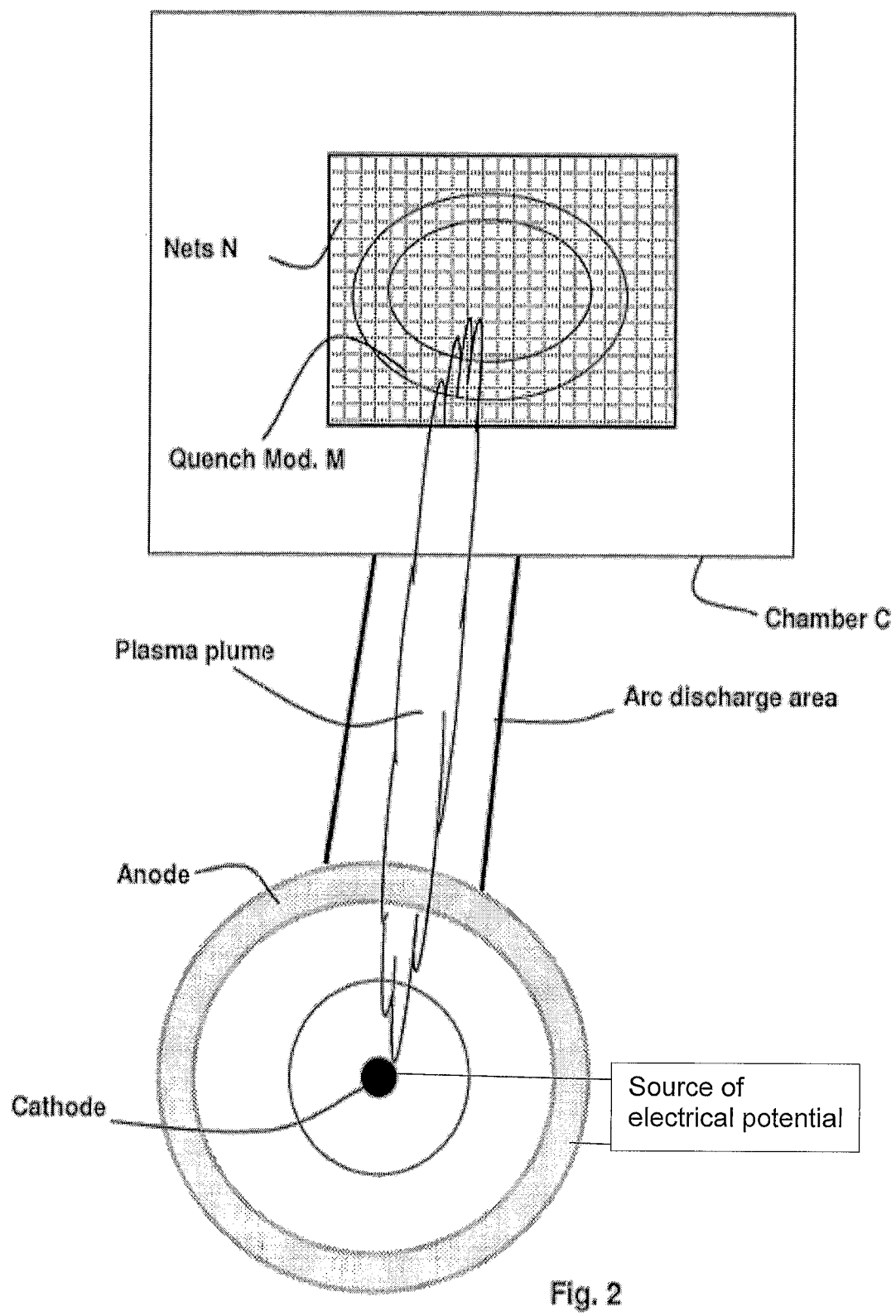
FIG. 2 is a schematic diagram of a top perspective view of a device as in FIG. 1.

Referring now to FIGS. 1 and 2, the present structure may be viewed as having three modules: an arc discharge area for creating a plasma plume or jet, shown towards the bottom of FIG. 1 and in the middle of FIG. 2; a port connector area, receiving plasma from the arc discharge area, for modulating and directing the plasma plume; and an environmental chamber C, connected to the port connector area downstream of the port connector, for collecting feed materials formed into the nanomaterials in a controlled environment. As shown in FIG. 1, the arc discharge area is on the bottom, and the port connector and environmental chamber are arranged in turn directly above; this takes in to account the tendency of hot gases to rise; other arrangements are possible. The arc discharge area, in which a plasma is formed, comprises an inlet(s) for a gaseous stream (e.g., ports A and/or B). The gaseous stream flows through a nozzle-like anode and cathode arrangement as shown. The anode and cathode are configured so as to forma nozzle with, in this case, a cathode extending towards an annular opening formed by the anode. Ports A and B can be seen in the port discharge area and are used to supply elements which will form the $B_xC_yN_z$-based nanomaterial. For example, port A may introduce a carrier gas (e.g., Ar, He, Xe, etc.) and a hydrocarbon or carbon for use as a carbon source. The hydrocarbon may be a gas such as ethane or methane, or a volatile liquid such as an alcohol (e.g., methanol) for contributing C to the nanoparticles. Port B may be used to introduce boron as an elemental powder, or a boron oxide, sulfide, nitride, or halide.

An extremely high-temperature plasma (e.g., around 10,000-20,000° C.) is produced via two electrodes (labeled anode and cathode in FIG. 1 and FIG. 2). The plasma is formed as a plasma plume and is initiated by applying a suitably high voltage (AC or DC, more often DC) between the electrodes. As stated, gases are injected into the arc region. The gas in a given first port may be a single gas or combination of gases, including nitrogen, argon, hydrogen, and hydrocarbons. A second injection port may be used to supply other chemicals to the plasma gas upstream of the plasma initiation region. Ports A and B are arranged to supply the gases and/or powders into the device so that they are swept into the arc discharge between the anode and cathode. The plasma initiation region (i.e., arc discharge area) may have a variety of configurations as is known in the art. Certain commercially available plasma plume producing devices may be adapted for uses in the present device. An exemplary design of a plasma plume producing device may be found in U.S. Pat. No. 4,661,682 entitled "Plasma spray gun for internal coatings," or in U.S. Pat. No. 5,368,897, entitled "Method for arc discharge plasma vapor deposition of diamond."

The hot plasma, in the form of a plasma plume from the arc discharge area, from the arc discharge area, is injected into a port connector area, which is sealed to the arc discharge area and also connected to and sealed to a pressure-controlled environmental chamber (described further below). The port connector area comprises additional inlets for feedstock for the BN-based nanomaterial or other nanomaterial being formed, shown as port D and port E. The plasma temperature and velocity is lower in the port connector area, and different feeds may be introduced here to react in the conditions in this area, where the plasma passes through in a generally tubular containment. Thus, prior to reaching the environmental chamber C, and near the plasma introduction region, two additional injection ports (port D and port E) are located in order to introduce materials in the plasma plume region immediately downstream from the second electrode. Port D and port E each inject chemicals (including catalysts, if desired) into the hot plasma region. Fine tungsten powder can be injected into the arc region through an injection port, where it will provide a catalytic function for the reaction.

Thus there are four ports in the present embodiments which introduce gases or other reactants in the arc region (ports A and B) and, downstream from the arc region, into the plasma region (ports D and E). The number and arrangement of ports may be varied to suit the plasma plume conditions, the BN-based nanomaterial to be created, etc. The feed materials are exposed to three different separately controlled zones: (1) the arc discharge zone, (2) the port connector area, having inlets and downstream of the plasma origin; and (3) the environmental chamber with a quench area, where the reactants are cooled or heated further and collected.

Beyond ports D and E, in the environmental chamber C, a quench moderator (M) is located, partly in or just beyond the main plasma stream. The quench moderator M controls local temperature gradients. That is, the quench moderator is designed to be contacted by a substantial portion of the plasma plume and to have a cooling effect and/or a slowing effect on the plasma plume and reactants therein. As shown in FIG. 1, the quench moderator M has a connection 106 to an external water supply and outlet, so that a cooling stream may be circulated through the quench moderator M. Additional water-cooling lines 102, 104 cool the cathode and anode, respectively. As shown in FIG. 2, the quench moderator M may be in the form of an annular member with a center opening through which the plume passes. The quench moderator M may be of a variety of shapes, e.g., straight tube, curved tube, serpentine tube, etc. The quench moderator M may be movable or positionable within the center of the plasma plume and/or for positioning closer or farther from the port connector area. The quench moderator M may be mobile in use, for example a rotating water-cooled metal or ceramic ring. Notably, the geometry of the quench moderator need not be symmetrical with that of the plasma plume, e.g., only a portion of the quench moderator may interact substantially with the plasma plume.

Also in environmental chamber C are one or more nets N, downstream of the quench moderator M. Nets N may be a grid or other structure on which the reacted elements condense and form the present nanoparticles (i.e., nanotubes and nanostructures). As shown in FIG. 2, a net N may be a mesh axially aligned with the quench moderator M and perpendicular to the plasma plume. Net(s) N are constructed and arranged to provide surface area on which the BN-nanomaterials may collect and be harvested intact. They may consist of metal or ceramic surfaces with large surface area, such as a honeycomb. They are positioned so as to receive materials formed in the gaseous stream exiting the plasma.

The environmental chamber C also has an enclosed structure that provides for controlled pressure inside the chamber and encompassing the quench moderator. The internal pressure of environmental chamber C may be at, below, or above atmospheric pressure.

The gas pressure inside the chamber is controlled by lines leading to the chamber and a gas or vacuum source, controlled by a valve as shown at the top of FIG. 1. The valve is used during operation of the device to allow gas to escape when desired pressure is reached. The environmental chamber C also may have a controlled temperature and be fitted with heating or cooling elements (not shown).

Not shown in FIG. 1 are the necessary power supplies to sustain the plasma, or details of the chemical feed mechanism to supply the injection ports. Also not shown are pressure cylinders and vacuum plumbing. The arrangement of these components will be apparent from the present description and FIG. 1 and FIG. 2. Power supplies are used to generate a voltage potential between the anode and cathode and are commercially available for this purpose. The voltage potential between the electrodes will be between about 10 V and 50 V. Power supplies may also be used to create vacuum and/or pressure, and to increase the flow of gaseous materials into the ports, to control the rate and concentration of feedstock, to operate entry and exit valves in the environmental chamber C, etc. The chemical feed mechanism comprises a supply of the liquids, power or gas used to deliver the B, C or N feedstock as well as any dopants (e.g., carbon, lithium or sulfur) or catalysts.

Also not shown are certain water-cooling lines which may be necessary to cool the materials comprising the arc region, the moderator, and the environmental chamber. Cooling lines 102, leading to the cathode, 104, leading to the anode and 106, leading to the moderator.

The environmental chamber C can be vertically or horizontally oriented. In a vertical orientation, gravitational effects (e.g., buoyant forces) can be exploited. The synthesis apparatus can also be mounted on a centrifuge, allowing "artificial gravity" to be applied, which may be larger than g, the traditional gravitational acceleration near the surface of the earth. Collection nets N, downstream of the moderator M, may be distributed within chamber C to further facilitate "catching" and holding the produced nanomaterial.

Method of Operation

In operation, the materials to comprise the BN-based nanomaterial, e.g., boron, nitrogen or nitrides and elemental carbon or hydrocarbons are introduced via ports A, B, D or E. They are introduced separately at separate ports. The electrodes are essentially inert, i.e., they are not used as sources of material and may comprise tungsten or copper or similar electrical conductors. If tungsten is used, temperature at the electrode during synthesis should not exceeded 3700° K., the melting point of tungsten. A gaseous flow is created between the arc discharge area and the port connector area. The arc plasma area exits through a nozzle configuration formed by the arrangement of the anode and the cathode, creating a forceful spray. If an inert propellant gas is used, it will be generally at 600-700 torr for low pressure environmental chamber conditions and substantially higher (generally several to several hundred atmospheres) for high pressure environmental conditions.

The anode may be annular, with a conical tipped cathode in the center of the opening, as in a liquid spray nozzle. The feed materials enter the plasma at an elevated temperature in the arc discharge are (i.e., near the electrodes) and at a lower temperature/velocity area downstream, in the port connector area. In one embodiment, the electrical current is DC between 10 A and 200 A, with the gap between the electrodes maintained such that the voltage is between 10 V and 50 V to form an arc.

From there, the materials flow to a quench area, where the temperature is lowered from the high plasma temperatures. From the quench area, the materials, having combined to form the nonmaterial of interest, collect on a collection surface, such as a mesh or net. The quench area and collection area are kept at a controlled temperature and pressure, by a sealed environmental chamber.

Thus, the materials are introduced by ports A and or B into the plasma, which will typically have a temperature of several thousand degrees C. where the feeds from the ports enter. They flow at ambient conditions through a port connector are where they have slowed down and cooled by at least several hundred degrees C., then they pass in to an environmental chamber kept, e.g., at 0.1 torr to several hundred atmospheres, and 600 to 2000° C. The concentrations of the reactants are controlled according to the resultant end material desired, such as the values of x y and z in the formula $B_xB_yC_z$. In addition, the materials are controlled as to concentration in the port connector are and in the environmental chamber.

In one implementation, pure BNNTs are produced. Chamber C is vertically oriented. Nitrogen gas is introduced at elevated pressure via port A. A DC voltage is applied between the electrodes. A plasma is generated. Boron powder is introduced (via nitrogen gas flow) via port B or E. The chamber C is at rest and oriented vertically. The pressure in chamber C may be larger than 1 atm.

The system can be operated in a more or less continuous fashion, where harvesting devices are included to extract from the environmental chamber C the accumulated nanomaterials.

CONCLUSION

The above specific description is meant to exemplify and illustrate the invention and should not be seen as limiting the scope of the invention, which is defined by the literal and equivalent scope of the appended claims. Any patents or publications mentioned in this specification are intended to convey details of methods and materials useful in carrying out certain aspects of the invention which may not be explicitly set out but which would be understood by workers in the field. Such patents or publications are hereby incorporated by reference to the same extent as if each was specifically and individually incorporated by reference and contained herein, as needed for the purpose of describing and enabling the method or material referred to.

What is claimed is:

1. An apparatus comprising:
  a plasma source configured to generate a plasma jet, the plasma source defining at least one port for the introduction of a first chemical-species proximate a region where the plasma jet is generated;
  a port connector connected to the plasma source, the port connector configured to receive the plasma jet, the port connector defining at least one port along its length configured for the introduction of a second chemical-species to the plasma jet; and
  a chamber connected to the port connector;
  wherein the plasma source comprises a first and a second electrode;
  wherein the second electrode is positioned distal to the first electrode and proximal to the port connector; and
  wherein the first electrode is a conical tip electrode that extends towards an annular opening of the second electrode to form a nozzle.

2. The apparatus of claim 1, wherein the plasma source further includes a source of electric potential connected to the two electrodes, wherein the source of electric potential is configured to generate an arc across the two electrodes.

3. The apparatus of claim 1, further comprising:
  a net positioned in the chamber configured to collect nanomaterials.

4. The apparatus of claim 1, further comprising:
  a quench moderator positioned in the chamber.

5. The apparatus of claim 4, wherein the quench moderator is a cooled, inert member proximate the plasma jet and shaped as a linear rod, serpentine rod, or torus.

6. The apparatus of claim 4, wherein the quench moderator is positioned in the plasma jet and configured to allow the plasma jet to pass by the quench moderator.

7. The apparatus of claim 1, wherein the apparatus is configured to form nanostructures due to cooling of the plasma jet, and wherein the nanostructures comprise elements of the first and the second chemical-species introduced to the chamber.

8. An apparatus comprising:
  a plasma source configured to generate a plasma jet, the plasma source defining a port for the introduction of a nitrogen-containing species proximate a region where the plasma jet is generated;
  a port connector connected to the plasma source, the port connector configured to receive the plasma jet, the port connector defining a first port along its length, the first port configured for the introduction of a boron-containing species along the length of the plasma jet; and
  a chamber connected to the port connector;
  wherein the plasma source comprises a first and a second electrode;
  wherein the second electrode is positioned distal to the first electrode and proximal to the port connector; and
  wherein the first electrode is a conical tip electrode that extends towards an annular opening of the second electrode to form a nozzle.

9. The apparatus of claim 8, wherein the plasma source further includes a source of electric potential connected to the two electrodes, wherein the source of electric potential is configured to generate an arc across the two electrodes to generate the plasma jet.

10. The apparatus of claim 8, further comprising:
  a net positioned in the chamber configured to collect nanomaterials.

11. The apparatus of claim 8, further comprising:
  a quench moderator positioned in the chamber.

12. The apparatus of claim 11, wherein the quench moderator is a cooled, inert member proximate the plasma jet and shaped as a linear rod, serpentine rod, or torus.

13. The apparatus of claim 11, wherein the quench moderator is positioned in the plasma jet and configured to allow the plasma jet to pass by the quench moderator.

14. The apparatus of claim 8, wherein the apparatus is configured to form boron nitride nanostructures due to cooling of the plasma jet in the chamber.

15. The apparatus of claim 14, wherein the boron nitride nanostructures are selected from a group consisting of boron nitride nanotubes, boron nitride spheres, and boron nitride sheets.

16. The apparatus of claim 8, wherein the port connector defines a second port along its length, and wherein the second port is configured for the introduction of a carbon-containing species along the length of the plasma jet.

17. The apparatus of claim 8, wherein the boron-containing species is selected from a group consisting of elemental born, a boron oxide, a boron sulfide, a boron nitride, and a boron halide.

18. The apparatus of claim 8, wherein the nitrogen-containing species comprises nitrogen gas.

* * * * *

UNITED STATES PATENT AND TRADEMARK OFFICE
CERTIFICATE OF CORRECTION

PATENT NO. : 10,596,542 B2
APPLICATION NO. : 15/206143
DATED : March 24, 2020
INVENTOR(S) : Alexander K. Zettl Page 1 of 1

It is certified that error appears in the above-identified patent and that said Letters Patent is hereby corrected as shown below:

In the Specification

In Column 6, Line 45, delete "forma" and insert --form a--.

In Column 9, Line 28, delete "and or" and insert --and/or--.

In the Claims

In Column 11, Line 20, Claim 17, delete "born," and insert --boron,--.

Signed and Sealed this
Seventh Day of July, 2020

Andrei Iancu
*Director of the United States Patent and Trademark Office*